US011125711B2

(12) United States Patent
Speck

(10) Patent No.: US 11,125,711 B2
(45) Date of Patent: Sep. 21, 2021

(54) REFERENCE ELECTRODE AND METHOD FOR MANUFACTURING A REFERENCE ELECTRODE

(71) Applicant: Endress+Hauser Conducta GmbH+Co. KG, Gerlingen (DE)

(72) Inventor: Matthaeus Speck, Goepfersdorf (DE)

(73) Assignee: Endress+Hauser Conducta GbmH+Co. KG, Gerlingen (DE)

( * ) Notice: Subject to any disclaimer, the term of this patent is extended or adjusted under 35 U.S.C. 154(b) by 288 days.

(21) Appl. No.: 16/225,832

(22) Filed: Dec. 19, 2018

(65) Prior Publication Data

US 2019/0195824 A1    Jun. 27, 2019

(30) Foreign Application Priority Data

Dec. 19, 2017    (DE) .................... 10 2017 130 514.9
Aug. 15, 2018    (DE) .................... 10 2018 119 836.1

(51) Int. Cl.
    *G01N 27/30*    (2006.01)
    *G01N 27/406*    (2006.01)

(52) U.S. Cl.
    CPC ......... *G01N 27/301* (2013.01); *G01N 27/406* (2013.01)

(58) Field of Classification Search
    CPC .................................................. G01N 27/301
    See application file for complete search history.

(56) References Cited

U.S. PATENT DOCUMENTS 4,002,547 A * 1/1977 Neti .................... G01N 27/301
                                                            204/435
2009/0283404 A1* 11/2009 Kakiuchi ............. G01N 27/401
                                                            204/435

(Continued)

FOREIGN PATENT DOCUMENTS

CN    101523201 A1    9/2009
CN    102439431 A1    5/2012

(Continued)

OTHER PUBLICATIONS

Dong et al., "Understanding the hydrogen bonds in ionic liquids and their roles in properties and reactions," Chem. Commun. 2016, 52, 6744 (Year: 2016).*

(Continued)

*Primary Examiner* — Alexander S Noguerola
(74) *Attorney, Agent, or Firm* — Kelly J. Smith; Endress+Hauser (USA) Holding Inc.

(57) ABSTRACT

The present disclosure relates to a reference electrode including an electrical conductor, an electrically conductive salt bridge provided for contact with a measuring fluid, and a medium electrically conductively connecting the electrical conductor and the salt bridge to each other, wherein the medium and the electrical conductor are completely isolated with respect to the measuring fluid. The salt bridge comprises a polymer matrix and a conducting salt, the conducting salt is formed from a cation and an anion, and the cation and/or the anion are at least partially kept from leaching in the polymer matrix. The present disclosure further relates to an electrochemical sensor, a method for producing the reference electrode and a method for regenerating and/or conditioning the reference electrode.

20 Claims, 3 Drawing Sheets

(56) References Cited

U.S. PATENT DOCUMENTS

2013/0153417 A1* 6/2013 Shibata ................ G01N 27/302
                                                            204/414
2014/0158536 A1* 6/2014 Thompson ........... G01N 27/333
                                                            204/406

FOREIGN PATENT DOCUMENTS

| CN | 102971621 A  | 3/2013 |
|----|--------------|--------|
| CN | 103299180 A  | 9/2013 |
| JP | 5946782 B2   | 9/2014 |
| WO | 2017130218 A1| 8/2017 |

OTHER PUBLICATIONS

Iwamoto et al., "Novel Hydrogen-Bonding Pattern of Water in Polycarbonate," Bull. Chem. Soc. Jpn. 2017, 90, 527-536 (Year: 2017).*

"Fluoroelastomer" definition in the online Encylopedia Britannica, Jan. 22, 2021. (Year: 2021).*

Shvartsev et al., "Reference electrode assembly and its use in the study of fluorohydrogenate ionic liquid silicon electrochemistry," Phys. Chem. Chem. Phys., 2013, 15, 17837 (Year: 2013).*

Fuller et al., "Ionic Liquid-Polymer Gel Electrolytes." 1997 J. Electrochem. Soc. 144 L67 (Year: 1997).*

Zou et al., "Ionic Liquid Reference Electrodes With a Well-Controlled Co(II)/Co(III) Redox Buffer as Solid Contact," Electroanalysis 2015, 27, 602-608 (Year: 2015).*

* cited by examiner

REFERENCE ELECTRODE AND METHOD FOR MANUFACTURING A REFERENCE ELECTRODE

CROSS-REFERENCE TO RELATED APPLICATIONS

The present application is related to and claims the priority benefit of German Patent Application Nos. 10 2010 2017 130 514.9, filed on Dec. 19, 2017 and 10 2018 119 836.1, filed on Aug. 15, 2018, the entire contents of which are incorporated herein by reference.

TECHNICAL FIELD

The present disclosure relates to a reference electrode and a method for manufacturing a reference electrode.

BACKGROUND

Potentiometric sensors are used in the laboratory and process measurement technology in many areas of chemistry, biochemistry, pharmacy, biotechnology, food technology, water management, and environmental monitoring for the analysis of measuring media, for example, measuring fluids. Potentiometric sensors allow detection of activities of chemical substances, such as ion activities, and therewith correlated measured variables in liquids. The substance whose concentration is to be measured is also referred to as an analyte. The potentiometric sensor according to the present disclosure that is described below may, for example, be used to measure a measured variable which is dependent upon the activity of an analyte in a measuring medium. This measured variable can be an activity or a concentration of the analyte, such as a specific ion species or a pH value. The measuring medium can be a measuring fluid, such as an aqueous solution, emulsion or suspension.

Potentiometric sensors typically comprise a measuring half cell, also referred to as a measuring electrode, and a reference half cell, also referred to as a reference electrode, and a measurement circuit. The measuring electrode and the reference electrode are brought into contact with the measuring medium for measurement. In contact with the measuring medium, the measuring electrode forms a potential that is a function of the activity of the analyte in the measuring medium, whereas the reference electrode provides a stable reference potential independent of the analyte concentration. The measurement circuit generates an analog or digital measuring signal which represents the potential difference (measurement voltage) between the measuring electrode and the reference electrode and, consequently, the activity of the analyte in the measuring medium. The measuring signal may be output from the measurement circuit to a higher-level unit which is connected to the sensor and further processes the measuring signal. The higher-level unit can be a measuring transducer or a process controller such as a PLC.

The measuring electrode includes a potential-forming sensor element which may comprise an ion-selective membrane, depending upon the type of the potentiometric sensor. Examples of such measuring electrodes are ion-selective electrodes (ISE). Conventional ion-selective electrodes have a housing that is sealed off by the ion-selective membrane and accommodates an internal electrolyte that is in contact with the membrane. Furthermore, such ion-selective electrodes comprise a terminal lead which is in contact with the internal electrolytes. The terminal lead is conductively connected to the measurement circuit. If the ion-selective membrane for measuring is in contact with the measuring medium, the membrane selectively interacts with a certain ionic species contained in the measuring medium, namely with the analyte. By changing the activity or concentration of the analyte in the measuring medium, a relative change in the equilibrium galvanic voltage between the measuring medium and the terminal lead in contact with the ion-selective membrane is thus effected via the internal electrolyte and correspondingly leads to a change in the measurement voltage detected by the measurement circuit between the terminal lead of the measuring electrode and the reference electrode. A special case of such an ion-selective electrode, i.e., an electrode that selectively detects the $H^+$ or hydronium ion activity in a measuring fluid, is the known pH glass electrode, which comprises a pH-selective glass membrane as the ion-selective membrane.

The reference electrode of conventional potentiometric sensors is often designed as a second-type electrode, e.g., designed as a silver/silver chloride reference electrode, and is electrically conductively connected to the measurement circuit. It comprises a reference element, which in the case of a silver/silver chloride reference electrode is designed as silver wire coated with silver chloride. This wire is in contact with a reference electrolyte, for example, a highly concentrated KCl solution thickened in some cases by adding a polymer and accommodated in a housing of the reference electrode. In order to detect the measurement voltage representing the analyte concentration between the reference electrode and the measuring electrode, the reference element must be in electrically conductive contact with the measuring medium. This is commonly implemented via a salt bridge, e.g., an electrolyte-filled porous ceramic material. A material transport from the reference electrolyte into the measuring medium and in the opposite direction is possible via the salt bridge.

This can disadvantageously lead to contamination of the reference electrode and/or to the reduction in chloride of the reference electrolyte. Both can cause drift of the reference electrode potential and, thus, distortion of the measurement result. In addition, the production of reference electrodes having such salt bridges is expensive and the junction between the material of the salt bridge and the housing wall of the reference electrode is a mechanical weak point of the sensor.

Fixed-contact electrodes have already for quite some time been considered as possible alternatives to electrodes of the second type with internal electrolyte and a salt bridge allowing a mass transfer. Thus, in the H. Galster textbook, "pH-Messung—Grundlagen, Methoden, Anwendungen Geräte" [pH Measurement—Principles, Methods, Applications, Devices], VCH Verlagsgesellschaft mbH, Weinheim, 1990, p. 101, a reference electrode is described which has a silver metal carrier onto which a layer of silver chloride, with or without plastic, and a layer of potassium chloride are applied. A cellulose ester is then applied over that as a salt bridge. Such a reference half cell can be produced as a wire coated electrode by repeated immersion into said media. The advantage of such a reference half cell is easy and economical manufacturability. Although the emission of chloride from the reference electrode into the measuring medium is not prevented in such cells, it takes place more slowly.

In practice, however, it has become apparent that reference electrodes of this type having a fixed terminal lead are not sufficiently shielded with respect to the measuring medium. Thus, when redox-active foreign substances are present in the medium or other contaminants enter from the medium through the salt bridge, significant cross sensitivities of the reference electrode and/or an undesirable drift of the reference potential can occur. Depending on the composition of the measuring medium, it is also possible for enhanced chloride ions to be released from the layers of the reference electrode, which leads to increased drift of the reference electrode potential.

SUMMARY

The object of the present disclosure is to provide a reference electrode which reduces or prevents the aforementioned disadvantages.

The reference electrode according to the present disclosure includes an electrical conductor, a salt bridge provided for contact with a measuring fluid, and a medium electrically conductively, or at least ionically conductively, connecting the electrical conductor and the salt bridge to each other, where the medium and the electrical conductor are completely isolated with respect to the measuring fluid, where the salt bridge comprises a polymer matrix and a conducting salt, where the conducting salt is formed from a cation and an anion, and where the cation and/or anion are at least partially kept from leaching in the polymer matrix.

An increased ionic strength or conductivity of the salt bridge is ensured by embedding a conducting salt into the polymer matrix and keeping it from leaching, so that diffusion potentials on the salt bridge are kept low. At the same time, any drift of the reference potential is counteracted by reducing or preventing leaching of the conducting salt from the polymer matrix.

The composition of the salt bridge can advantageously be selected such that the salt bridge has little or, ideally, no electronic conductivity. Any influence of the reference electrode potential by redox-active substances in a measuring fluid contacting the salt bridge is thus prevented or at least sharply reduced.

The polymer matrix may be a first component and the conducting salt a second component of a composite forming the salt bridge. The composite can be, for example, a hybrid material. The term "hybrid material" is understood to mean a composite of at least two components on a microscopic or nanoscopic or molecular level, where different interactions can exist between the components. For example, van der Waals interactions, hydrogen bridge bonds and/or electrostatic interactions or chemical bonds, for example ionic or covalent bonds, can exist between the first component and the second component. If the polymer matrix and the conducting salt form a hybrid material, the conducting salt is kept from leaching in the polymer matrix by one or more of the aforementioned interactions or bonds.

In one embodiment of the reference electrode, the cation and/or the anion of the conducting salt can be covalently bonded to the polymer matrix and thereby kept from leaching.

The cation and/or the anion of the conducting salt can also be held in the polymer matrix by electrostatic interactions or by hydrogen bridge bonds or by van der Waals interactions in the polymer matrix.

The cation and/or anion of the conducting salt may be present at least partially in macromolecular form. By virtue of its size, the cation and/or anion present at the macromolecular level is held in the polymer matrix and a leaching of the conducting salt is thus prevented. For example, the cation and/or anion may be polymerized or bonded to a polymer backbone.

In one embodiment, the conducting salt can be an ionic liquid, such as an ionic liquid derivatized with anchorable functional groups, such as with an alkyl-, alkenyl-, alkynyl-, allyl- or vinyl-substituted imidazolium cation, an alkyl-, alkenyl- or alkynyl-substituted phosphonium cation, an alkyl-, alkenyl- or alkynyl-substituted pyridinium cation or with a tetrasubstituted alkyl-, alkenyl- or alkynylammonium cation. Furthermore, these anchorable functional groups may have further functionalities based on increments of, for example, amine, imine, halogen, ester, amide, imide, alcohol, ether, isocyanate, nitrile, epoxy and/or carbonyl. The ions of an ionic liquid are very suitable for forming hybrid compounds or composites with duromeric or elastomeric polymers and can be anchored well against leaching in the polymer matrix of a crosslinked polymer. It is not ruled out that an ionic liquid contained in a polymer matrix and kept from leaching by van der Waals or electrostatic interaction or by chemical bonds, such as in interaction with a measuring medium in which the salt bridge is immersed, leads to swelling of the salt bridge.

The conducting salt can be present as monomeric ionic liquid or as polymerized ionic liquid. A polymerizable or polymeric ionic liquid (PIL) is taken to mean a class of polyelectrolytes which includes polymers functionalized with functional groups of ionic liquids, cf., for example, the article—D. Mecerreyes, Polymeric ionic liquids: Broadening the properties and applications of polyelectrolytes, Progress in Polymer Science 36, 2011, pp. 1629-1648. Functional groups of ionic liquids are, for example, imidazolium, pyrrolidinium and pyridinium cations or tetrafluoroborate, hexafluorophosphate and triflate anions. These polymers can be produced, for example, by polymerization or copolymerization of monomers of cations or anions of ionic liquids, for example, the ones mentioned above, or by attachment of cations or anions of ionic liquids to a polymer backbone. A variety of examples of polymeric ionic liquids can be found in the aforementioned article.

The polymer matrix may be a duromer or an elastomer. Duromers are also referred to as synthetic resins. A duromer is a plastic with tight crosslinking which, after it has hardened, can no longer be deformed by heating or other means. Elastomers are dimensionally stable but elastically deformable plastics whose glass transition point is below the working temperature. The elastomers also have crosslinking but not as tight as in the case of duromers. The use of crosslinked polymers as polymer matrix has the advantage of a higher temperature stability compared, for example, to thermoplastics, such as PVC or cellulose esters, which are composed of linear chains that are connected to one another only by weak physical bonds. The higher crosslinking also contributes to a reduction in leaching of the conducting salt.

The polymer matrix can be formed, for example, by a polysiloxane (silicone rubber), olefin rubber, fluororubber, e.g. PVDF, polyurethane, polyacrylate, or by a derivative of one of these polymers or by a polymer blend comprising at least one of these polymers.

The polymer matrix may be a copolymer based on at least a first and a second monomer, wherein the first and/or the second monomer is selected from the group composed of: 1,3-butadiene, 2-methyl-1,3-butadiene, acrylonitrile, acrylic acid ester derivatives, vinyl acetate, diethylene glycol divinyl ether, vinyl alcohol derivatives, ethylene, propylene, isobutylene, styrene, divinylbenzene, dicyclopentadiene, 1,4-hexadiene, ethylidene norbornene, vinyl chloride, terpenes, chloroprene, 1,1-difluoroethene, tetrafluoroethene, ε-caprolactam, dodecyl lactam, lactams, phenylene diamine, hexamethylene diamine, ethylene oxide, 1,2,3-propylentriol, polyols, hexamethylene diisocyanate, toluylene diisocyanate, methylene diphenyl isocyanate, naphthylene diisocyanate, isophorone diisocyanate, 4,4'-diisocyanatodicyclohexylmethane, allyltriethoxysilane, vinyltrimethoxysilane, alkenyl siloxane derivatives.

The aforementioned medium electrically conductively connecting the electrical conductor and the salt bridge can be formed as an intermediate layer in electrically conductive contact with the conductor and the salt bridge.

Alternatively, the medium may also be a conventional liquid or a viscous or immobilized reference electrolyte thickened by a polymer. In this embodiment, the electrical conductor can be a silver wire coated with silver chloride.

If the medium is formed as an intermediate layer arranged between the salt bridge and the electrical conductor, the salt bridge can be configured as a layer covering at least a portion of the intermediate layer, such as a layer directly applied to the intermediate layer.

The intermediate layer may comprise an electron- and/or ion-conducting polymer, such as a doped, intrinsically conductive polymer. For example, the intermediate layer may have a doped, intrinsically conductive polymer based on a polythiophene, a polyaniline, a paraphenylene or a polypyrrole. Poly-3,4-ethylenedioxythiophene doped with polystyrene sulfonate, also referred to as PEDOT:PSS, is suitable, for example.

In the salt bridge, or in the polymer matrix, fillers can be included, for example by means of compounding, that have an influence on the thermal and/or mechanical properties of the salt bridge. The fillers can be, for example, oxide and/or oxide ceramic particles, e.g. made of silicon dioxide in the form of silicon dioxide ceramic particles or in the form of amorphous silica gel, made of zirconium dioxide or aluminum oxide.

The polymer matrix may additionally or alternatively be modified with a redox-active substance, for example a prussiate, a ferrocene derivative, such as vinyl ferrocene, ethynyl ferrocene, formyl ferrocene or a derivative of another metallocene. This allows compensation of charging and discharging effects which can occur in the reference electrode when used in a potentiometric measurement, since in a potentiometric measurement, measuring-signal-dependent currents or measurement-voltage-dependent currents in the order of a few pA flow. If the polymer matrix contains a redox-active substance, the potential of the reference electrode can be adjusted by partial or complete oxidation or reduction of the substance. If the reference electrode is used in a potentiometric measuring chain, the measuring chain zero point can be set in this way. This is also referred to as conditioning the reference electrode.

The electrical conductor may comprise an electron conductor, such as a metal, an electron-conducting ceramic or an electrically conductive carbon-based material, e.g. graphite, glassy carbon or carbon fibers.

In one possible embodiment, the reference electrode comprises a housing with an opening that is sealed off by the salt bridge, wherein at least a portion of the electrical conductor is disposed within the housing. An electrolyte contacting the salt bridge can be contained in the housing, wherein the portion of the electrical conductor arranged within the housing contacts the electrolyte. The electrical conductor may comprise a reference element formed of silver coated with silver chloride. In this case, the electrolyte can be an aqueous electrolyte solution, in some cases thickened or immobilized by means of a polymer, that contains a high chloride concentration, for example in the form of dissolved potassium chloride. The concentration of chloride in the electrolyte may be, for example, about 3 mol/l. Alternatively, an electrically conductive layer which contacts the salt bridge on the rear side, that is, on the side facing the housing interior, and which on its part is contacted by the at least one section of the electrical conductor, can be arranged within the housing. A fixed terminal lead of the reference electrode is realized in this way.

The present disclosure also comprises an electrochemical sensor having a reference electrode according to any of the above-described embodiments, at least one additional electrode and a measurement circuit that is electrically conductively connected to the reference electrode and the additional electrode and that is configured to generate electrical measuring signals representing a concentration or activity of an analyte in the measuring fluid.

The electrochemical sensor may be an amperometric sensor. In this case, the sensor includes a third electrode, and the measurement circuit is configured to detect a current flow between the additional electrode and the third electrode when a predetermined voltage is present between the reference electrode and the additional electrode, if the reference electrode, the additional electrode and the third electrode are in contact with the measuring fluid.

The electrochemical sensor may be, for example, a potentiometric sensor. In this case, the measurement circuit is configured to detect a measurement voltage between the reference electrode and the additional electrode in contact with the measuring fluid.

The additional electrode can be, for example, a pH glass electrode or an ion-selective electrode for the selective detection of a specific ion. The measurement circuit, the additional electrode and the reference electrode can be inseparably combined in a measuring probe that can be brought into contact with the measuring fluid. The measurement circuit may alternatively be divided into a sensor circuit, which is combined with the additional electrode and the reference electrode in a measuring probe, and an evaluation circuit, which is connected to the sensor circuit for communication and in some cases for energy transmission and is spatially separated from the sensor circuit. In a specific embodiment, the glass electrode or ion-selective electrode can be configured as an electrode with a fixed terminal lead, i.e. the glass membrane or an ion-selective membrane of the additional electrode can be connected to an electrically conductive terminal lead of the additional electrode via an electrically conductive, such as ion-conducting, intermediate layer.

The reference electrode can charge up or recharge during the potentiometric or amperometric measurement process because measuring-signal-dependent currents or measurement-voltage-dependent currents flow through the reference electrode. The accompanying polarization over time may result in a change of the zero point of the sensor characteristic. The salt bridge of the reference electrode or the intermediate layer mentioned above and arranged between the salt bridge and the electrical conductor can contain at least one redox-active substance, for example a metallocene such as vinyl ferrocene, which is contained in the polymer matrix, such as bonded to the polymer matrix, or a prussiate or a transition metal oxide in order to buffer this effect. If the intermediate layer comprises, as proposed for one of the embodiments of the reference electrode described above, a doped, intrinsically conductive polymer based on a polythiophene, a polyaniline, a paraphenylene or a polypyrrole, e.g. PEDOT:PSS, a special modification of the intermediate layer or of the polymer matrix with an additional redox-active substance can be dispensed with for this purpose.

In one embodiment, the measurement circuit can be configured to be intermittently shifted, for example, between measuring mode phases into a regeneration mode, and in the regeneration mode to suitably polarize the reference electrode in order to compensate for the polarization of the reference electrode caused in measuring mode. The voltage applied is such that the redox-active substance is at least partially reduced or oxidized. If, as mentioned, the intermediate layer is configured on the basis of a doped, intrinsically conductive polymer, the applied voltage can be such that the polymer is partially reduced or oxidized.

For this purpose, the measurement circuit can be designed to apply a voltage between the reference electrode and an auxiliary electrode for at least a specific period of time, wherein a current flow effected between the reference electrode and auxiliary electrode passes through the salt bridge and the intermediate layer of the reference electrode. The time period may be set such that a particular charge flows across the reference electrode to set a desired reference potential or a desired measuring chain zero point of the sensor.

The present disclosure also comprises a method for producing a reference electrode according to any of the above-described embodiments. The method comprises steps of applying a solution of a polymerizable monomer or oligomer, a vulcanizable prepolymer or a vulcanizable polymer preparation or of a polymer as well as a cation and an anion of a conducting salt, such as a polymerizable or polymeric ionic liquid, to an electrically conductive carrier, and drying the solution and/or polymerizing the monomers or oligomers and/or crosslinking or vulcanizing the prepolymer and/or the polymer preparation. A layer is formed comprising a polymer matrix in which the cation and/or the anion are at least partially kept from leaching in the polymer matrix.

During or prior to the drying and/or polymerization step, the cation and/or anion may be bound to the polymer matrix to keep it from leaching in the polymer matrix.

If the cation and/or anion is present in macromolecular form, for example in the form of a polymeric ionic liquid, it can be kept from leaching by virtue of its size in the polymer matrix formed by crosslinking and/or vulcanization.

The electrically conductive carrier on which the layer is formed can comprise an electrical conductor or an electrical conductor having an electrically conductive coating. In a step preceding the application of the solution, the electrical conductor having an electrically conductive coating can be produced by applying a layer of a conductive polymer, for example a doped, intrinsically conductive polymer, to an electrically conductive, e.g. metallic or carbon-containing, substrate. The substrate may be a wire, a fiber or a braided fiber fabric. It can also be formed as a layer which in turn is applied to an electrically insulating substrate. The conductive polymer applied to the electrically conductive substrate to form the electrically conductive coating can be a doped, intrinsically conductive polymer based on a polythiophene, a polyaniline, a paraphenylene, or a polypyrrole. Poly-3,4-ethylenedioxythiophene (PEDOT:PSS) doped with polystyrene sulfonate is a possibility, for example. The conductive substrate can be coated with the conductive polymer by a conventional method, e.g. dip coating or impregnating.

The present disclosure also relates to a method for conditioning or regeneration of a reference electrode according to any of the above-described embodiments, wherein the medium electrically conductively connecting the electrical conductor and the salt bridge to each other is configured as an intermediate layer in electrically conductive contact with the conductor and the salt bridge. This method comprises steps of immersing at least a region of the reference electrode comprising the salt bridge and a counter electrode arranged on a side of the salt bridge facing away from the electrical conductor of the reference electrode in an electrically conductive fluid, and applying a voltage across the salt bridge, for example between the electrical conductor and the counter electrode, in such a way that the intermediate layer and/or a redox-active substance with which the intermediate layer or polymer matrix of the salt bridge is optionally modified is either oxidized or reduced, as desired.

The voltage can be applied over a fixed predetermined period of time or until a certain charge has flowed through the reference electrode. The counter electrode can be an auxiliary electrode, e.g. in the form of an electrically conductive housing part or an electrically conductive coating of a housing part of a measuring probe comprising the reference electrode. The auxiliary electrode can also be a metal pin or another electronically conductive body, such as a metallic or carbon-containing body.

The applied voltage can serve to selectively modify the redox state of the intermediate layer of the at least one glass electrode in order to set a zero point of the reference electrode or of a sensor comprising the reference electrode and/or in order to compensate for undesirable polarization effects or a sensor drift occurring over the service life of the reference electrode or the sensor.

BRIEF DESCRIPTION OF THE DRAWINGS

The present disclosure is explained in further detail below on the basis of the exemplary embodiments shown in the figures. Shown are.

DETAILED DESCRIPTION

Figure 1:
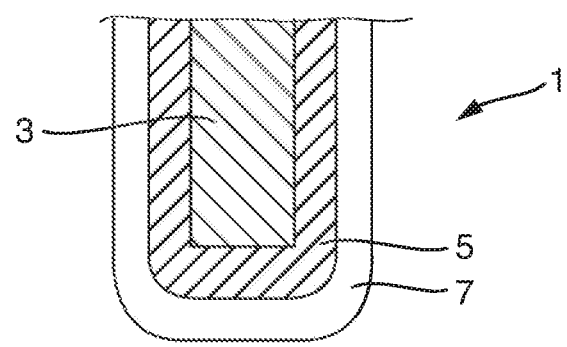
FIG. 1 shows a schematic representation of a reference electrode according to a first embodiment.

Schematically illustrated in FIG. 1 is a longitudinal section through a front end of a reference electrode 1 specified for contact with a measuring medium, e.g., a fluid measuring solution, according to a first exemplary embodiment. The reference electrode 1 has an electrical conductor 3; in the present example, a carbon fiber wire. An electrically conductive coating serving as an intermediate layer 5 is applied directly onto the conductor 3. This coating is formed in the present example by a doped, intrinsically conductive polymer, e.g., PEDOT:PSS. Arranged on the intermediate layer 5 is another layer that serves as the salt bridge 7 of the reference electrode 1. In the present example, the salt bridge 7 is formed by a polymer matrix containing a conducting salt, which is kept from leaching in the polymer matrix, for example by electrostatic or van der Waals interactions or by a chemical bond. The cation and/or the anion of the conducting salt can be present in macromolecular form and in this way can already be kept from leaching in the polymer matrix by virtue of its size. In the present example, the polymer matrix is formed by a duromer or an elastomer, e.g., by a silicone rubber. The anion or cation of the conducting salt may be a polymerizable or polymeric ionic liquid.

Figure 2:
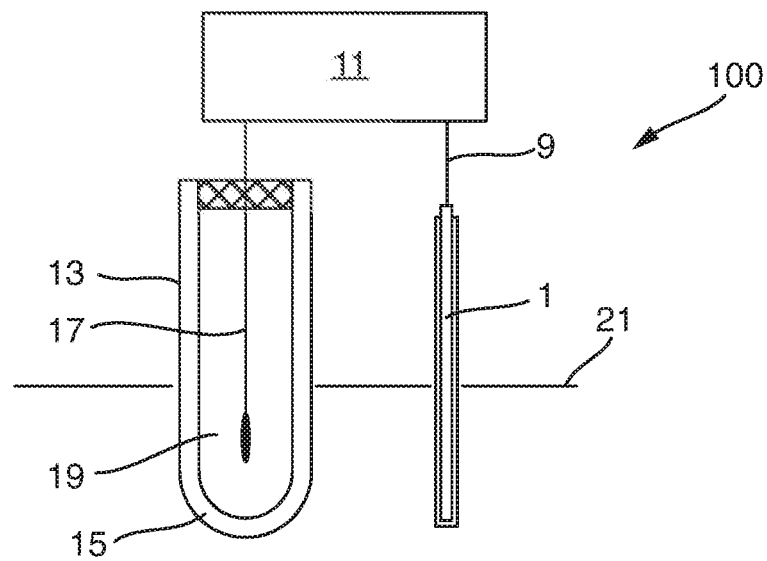
FIG. 2 shows a schematic representation of a potentiometric sensor in a first embodiment.

FIG. 2 schematically shows a potentiometric sensor 100 for measuring a pH value of a measuring fluid 21 in longitudinal section. The sensor 100 comprises a reference electrode 1 and a measuring electrode 13. The reference electrode 1 is constructed as described with reference to FIG. 1. It comprises an electrical conductor, e.g., made of carbon fiber wire, that is electrically conductively connected via a terminal lead 9 to a measurement circuit 11. At least in the section intended for immersion in the measuring fluid 21, the electrical conductor is coated with a layer serving as a salt bridge that is formed from a polymer matrix and a conducting salt, e.g. an ionic liquid, embedded in the polymer matrix. Arranged between the salt bridge and the electrical conductor is an electrically conductive intermediate layer, e.g., made of a conductive polymer.

The measuring electrode 13 comprises a cylindrical housing shaft which is sealed off at its front end, which dips into the measuring fluid 21 for the measurement, by an ion-selective membrane 15, in the present example a pH glass membrane. On the rear side, the housing shaft is sealed off by an adhesive bond, for example with a synthetic resin. The interior of the housing shaft is filled with an internal electrolyte 19 which contacts the ion-selective membrane 15 on the rear side. The internal electrolyte 19 is contacted by a potential terminal lead 17, which in the present example is configured as a silver-chloride-coated silver wire. The internal electrolyte 19 contains a high concentration of chloride ions and a pH buffering system by means of which the pH of the internal electrolyte 19 is set to a defined and stable pH value. The potential terminal lead 17 is electrically conductively connected to the measurement circuit 11.

The measurement circuit 11 is designed to detect a voltage arising in contact with the measuring fluid 21 between the measuring electrode 13 and the reference electrode 9 and to generate and output a measuring signal dependent on this voltage, for example to a display device (not shown) or to a higher-level unit, e.g., a process controller. Since the potential of the reference electrode 1 is substantially independent of the pH value, the measuring signal is a measure for the pH value. The pH value of the measuring fluid 21 can be calculated from the measuring signal generated by the measurement circuit 11 on the basis of a calculation rule determined by calibration. This calculation can be carried out by the measurement circuit 11 itself. In an alternative exemplary embodiment, the measurement circuit 11 can be connected to a higher-level arithmetic unit, e.g. a computer, smartphone or measuring transducer, and the higher-level arithmetic unit can be configured to measure the pH value of the measuring fluid on the basis of the measuring signal received by the measurement circuit 11.

A redox-active additive, also referred to as redox mediator, can be embedded in the salt bridge. Suitable redox mediators are, for example, prussiates or metallocenes, or, more specifically, ferrocenes, such as vinylferrocene. The redox-active additive can additionally or alternatively be provided in the conductive intermediate layer 5. In the present example, the doped PEDOT:PSS forming the intermediate layer also acts as a redox mediator.

The measurement circuit 11 may be configured to selectively set the equilibrium potential of the reference electrode 1 and thus the zero point of the measuring chain voltage of the potentiometric sensor 100 in a targeted manner in a regeneration mode and/or in a conditioning mode. To this end, it can set a predetermined voltage and/or a predetermined current flow between the reference electrode and an auxiliary electrode in order to oxidize or reduce, depending on the position of the reference potential to be attained, the redox mediators contained in the salt bridge and/or the intermediate layer.

Figure 3:
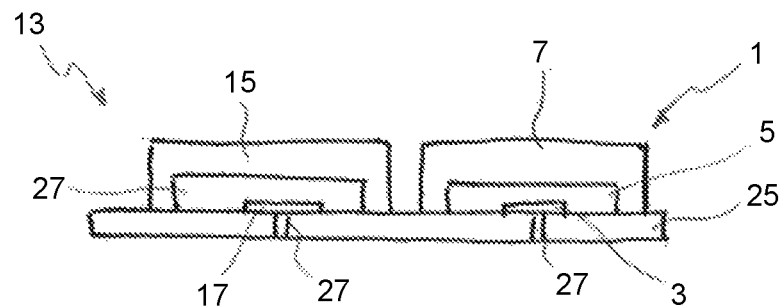
FIG. 3 shows a schematic representation of a potentiometric sensor in a second embodiment.

Schematically illustrated in FIG. 3 is another exemplary embodiment of a potentiometric sensor arrangement comprising a reference electrode 1 and a measuring electrode 13. In this exemplary embodiment, the measuring and reference electrodes are accommodated as layer arrangements on an electrically insulating substrate 25, for example, a printed circuit board or a ceramic substrate.

The reference electrode 1 comprises an electrical conductor 3 mounted on the substrate 25 as a layer, a conductive intermediate layer 5 that covers the electrical conductor 3 and that is made of, for example, an electrically conductive polymer, and a layer that is made of a polymer matrix containing a conducting salt that completely covers the intermediate layer 5 and that is used as the salt bridge 7 of the reference electrode 1. The salt bridge 7 may be designed to be identical in its composition to the salt bridge 7 described in reference to FIG. 1.

The measuring electrode 13 is also configured as a pH glass electrode in the example of FIG. 3. Like the reference electrode 1, it is arranged as a layer package on the substrate 25. The bottom layer arranged directly on the substrate 25 is made of an electrically conductive material, for example, a metal such as silver or copper. It forms the terminal lead 17 of the measuring electrode 13. An intermediate layer 27 made of an electron- and/or ion-conducting polymer is applied to the terminal lead 17. The intermediate layer 27 can be formed, for example, from an intrinsically conductive doped polymer, for example, PEDOT:PSS. In addition, it can comprise further additives, for example redox-active additives. A pH-sensitive glass membrane 15 is arranged on the intermediate layer 27 so that the intermediate layer 27 electrically conductively connects the rear side of the glass membrane 15 to the terminal lead 17.

If the glass membrane 15 and the salt bridge 7 contact a measuring fluid, a potential difference which can be tapped at the terminal lead 17 and the electrical conductor 3 arises. The terminal lead 17 and the conductor 3 can be connected to a measurement circuit (not shown in FIG. 2) which is designed to detect a voltage between the terminal lead 17 and the conductor 3 and to generate and output a measuring signal dependent thereon. The measurement circuit may likewise be arranged on the substrate 25 or be separate from the substrate 25. For contacting the terminal lead 17 and the conductor 3, the substrate 25 in the present example has feed-throughs 29.

Such a flat sensor arrangement can serve as the basis for producing a very compact and robust pH sensor. Instead of the pH glass membrane 15, the arrangement may also include an ion-selective membrane for selectively sensing a different ion. The sensor is then used to detect a concentration of this ion in the measuring fluid.

Figure 4:
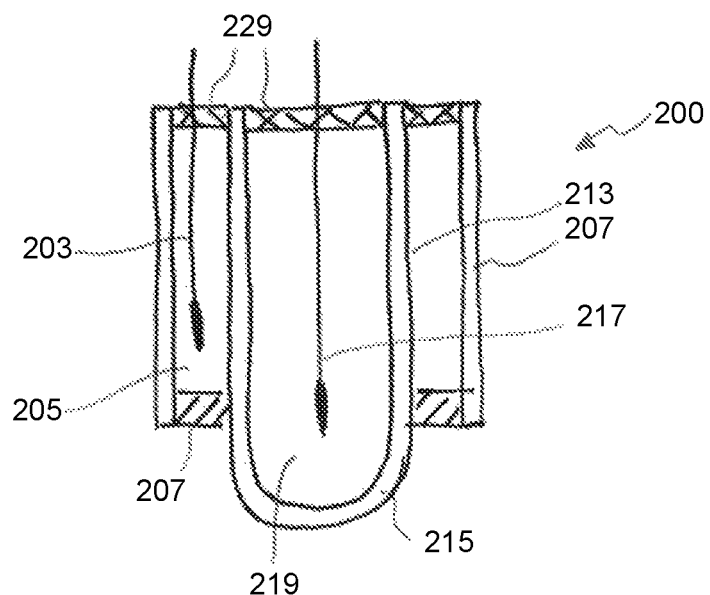
FIG. 4 shows a schematic representation of a potentiometric sensor in a third embodiment.

FIG. 4 schematically shows a further exemplary embodiment of a potentiometric measuring probe 200 for pH measurement in a longitudinal section. The measuring probe 200 is designed as a single-rod measuring chain. The measuring electrode 213 of the measuring probe 200 has a tubular housing which is sealed off at its front end, which is intended for contact with a measuring medium, by a pH-sensitive glass membrane 215. The interior of the housing of the measuring electrode 213 accommodates a pH buffered internal electrolyte 219, which additionally contains KCl. A potential terminal lead 217, which is configured as silver wire coated with silver chloride, is immersed in the internal electrolyte 219.

The reference electrode 201 has a tubular housing that coaxially surrounds the housing of the measuring electrode 213, so that an annular chamber is formed between the housing exterior side of the measuring electrode 213 and the housing interior side of the reference electrode 201. At its front end, which is intended for contact with the measuring medium, the housing of the reference electrode 201 is sealed off by a salt bridge 207. The salt bridge 207 comprises a polymer matrix, which in the present example is made of a rigid and thus mechanically stable duromer. However, the polymer matrix may also be made of a flexible elastomer. A reference electrolyte 219 that contains a high KCl concentration is contained in the annular chamber formed in this way and surrounding the measuring electrode 213. The reference electrolyte 219 is contacted by a reference element 203 that is made of a silver wire coated with silver chloride.

The housings of the measuring electrode 213 and the reference electrode 201 are sealed off on the rear side by adhesive bonding 229 with a synthetic resin. The reference element 203 and the potential terminal lead 217 of the measuring electrode are guided through the adhesive bonding 229 to the outside. They can be electrically conductively connected to a measurement circuit (not shown in FIG. 4) which is designed to measure a measurement voltage arising in contact with a measuring medium between the reference electrode 205 and measuring electrode 213 and to generate a measuring signal from the measurement voltage.

The reference electrode 1 shown in FIGS. 1 to 3 without a liquid internal electrolyte can be produced in a particularly simple manner. An example of a manufacturing method for such a reference electrode is specified below.

In a first step, a carbon continuous fiber (Sigrafil C t24-5.0/270 E100) is impregnated with an aqueous dispersion of PEDOT:PSS (3-4 wt. %) and dried at 130° C. for 15 min. An approximately 10 cm long section of the carbon continuous fiber thus modified is then coated, starting from one end, e.g., over a length of 7 cm, with a silicone rubber preparation by dip coating. For example, the silicone rubber preparation may be composed as follows: 900 g Elastosil RT601 A, 100 g Elastosil RT601 B, 100 g 3-hexadecyl-1-vinyl-1H-imidazolium-bromide. The silicone rubber preparation is then vulcanized at 70° C. for 15 min. The coated carbon continuous fiber thus obtained can be used as a reference electrode as shown in FIG. 1 or 2.

Figure 5:
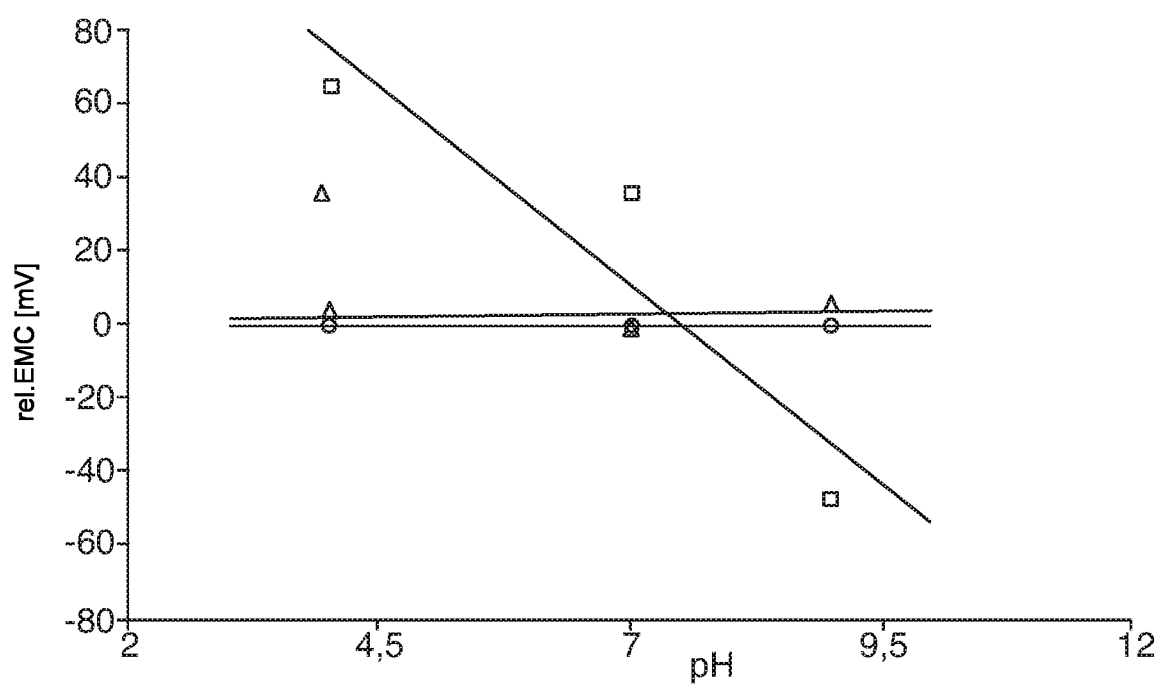
FIG. 5 shows a diagram of the potential of an ideal Ag/AgCl reference electrode vs. Ag/AgCl, a reference electrode according to the present disclosure vs. Ag/AgCl, and an electrode made of a polythiophene-coated carbon fiber wire vs. Ag/AgCl as a function of the pH of the measuring solution.

FIG. 5 shows measured values (triangles) of the half-cell potential of the reference electrode produced according to the method of the preceding exemplary embodiment against a conventional Ag/AgCl reference electrode in three measuring solutions having different pH values, namely pH 4, pH 7 and pH 9. In the graph of FIG. 5, the pH value of the measuring solution is plotted on the abscissa and the voltage (rel. EMC) measured in mV between the reference electrode and the Ag/AgCl reference is plotted on the ordinate. For comparison, measured values (squares) of a carbon fiber coated with polythiophene are also plotted against the Ag/AgCl reference in the various measuring solutions as well as the pH dependence of the potential of an ideal reference electrode relative to the Ag/AgCl reference (circles).

An ideal reference electrode for a potentiometric pH sensor (such as the sensors shown in FIGS. 2 and 3) should have no pH dependence whatsoever (value progression of the values represented by circles in the diagram). The carbon fiber provided with only one polythiophene layer shows a considerable dependence of its potential vs. Ag/AgCl on the pH value (value progression of the measured values represented by squares in the diagram). It is shown that, in contrast, the carbon fiber coated according to the above-described PEDOT:PSS method with an additional layer made of a silicone rubber matrix with 3-hexadecyl-1-vinyl-1H-imidazolium-bromide contained therein has a considerably reduced pH dependence of its potential vs. Ag/AgCl (value progression of the measured values shown with triangles in the diagram) and can thus serve as a reference electrode for pH measurements.

Optionally, the reference electrode produced according to the method described herein can also be arranged within a casing, e.g. made of glass or plastic, that has an opening, through which a fluid measuring medium can pass to the reference electrode. This casing can serve to mechanically protect the reference electrode but is not absolutely necessary.

The reference electrode 1 illustrated in FIG. 3 can be produced as a layer stack in a very analogous manner by applying the PEDOT:PSS suspension to the conductor track 3 arranged on the substrate 25, subsequently drying it, applying a silicone rubber preparation with the conducting salt, in the present example 3-hexadecyl-1-vinyl-1H-imidazolium-bromide, onto the PEDOT:PSS intermediate layer and subsequently vulcanizing the silicone rubber preparation.

The invention claimed is:

1. A reference electrode comprising:
   an electrical conductor;
   a salt bridge provided for contact with a measuring fluid; and
   a medium electrically conductively connecting the electrical conductor and the salt bridge to each other, wherein the medium and the electrical conductor are completely isolated with respect to the measuring fluid;
   wherein the salt bridge comprises a polymer matrix and a conducting salt;
   wherein the conducting salt is formed from a cation and an anion;
   wherein the cation and/or anion are at least partially kept from leaching in the polymer matrix;
   and wherein the cation and/or the anion of the conducting salt are covalently bonded to the polymer matrix.

2. The reference electrode of claim 1, wherein the polymer matrix forms a first component and the conducting salt forms a second component of a composite forming the salt bridge.

3. The reference electrode of claim 1, wherein the conducting salt is formed from a cation and an anion, and wherein the cation and/or anion are at least partially present in macromolecular form.

4. The reference electrode of claim 1, wherein the conducting salt is an ionic liquid.

5. The reference electrode of claim 1, wherein the polymer matrix is a duromer or a synthetic resin or an elastomer.

6. The reference electrode of claim 1, wherein the polymer matrix is a polysiloxane (silicone rubber), olefin rubber, fluororubber, polyurethane, polyacrylate, or a derivative of one of these polymers or a polymer blend comprising at least one of these polymers.

7. The reference electrode of claim 1, wherein the polymer matrix is a copolymer based on at least a first and a second monomer, wherein the first and/or the second monomer are selected from the group consisting of: 1,3-butadiene, 2-methyl 1,3-butadiene, acrylonitrile, acrylic acid ester derivatives, vinyl acetate, diethylene glycol divinyl ether, vinyl alcohol derivatives, ethylene, propylene, isobutylene, styrene, divinylbenzene, dicyclopentadiene, 1,4 hexadiene, ethylidene norbornene, vinyl chloride, terpenes, chloroprene, 1,1 difluoroethene, tetrafluoroethene, ε-caprolactam, dodecyllactam, lactams, phenylene diamine, hexamethylene diamine, ethylene oxide, 1,2,3-propylentriol, polyols, hexamethylene diisocyanate, toluylene diisocyanate, methylendiphenyl isocyanate, naphthylene diisocyanate, isophorone diisocyanate, 4,4' diisocyanatodicyclohexylmethane, allyltriethoxysilane, vinyltrimethoxysilane, alkenylsiloxane derivatives.

8. The reference electrode of claim 1, wherein the medium electrically conductively connecting the electrical conductor and the salt bridge is formed as an intermediate layer in electrically conductive contact with the conductor and the salt bridge.

9. The reference electrode of claim 8, wherein the salt bridge is configured as a layer covering at least a portion of the intermediate layer.

10. The reference electrode of claim 8, wherein the intermediate layer comprises an electron- and/or ion-conducting polymer.

11. The reference electrode of claim 8, wherein the intermediate layer has a doped, intrinsically conductive polymer based on a polythiophene, a polyaniline, a paraphenylene or a polypyrrole.

12. The reference electrode of claim 1, wherein fillers that have an influence on the thermal and/or mechanical properties of the salt bridge are incorporated into the salt bridge.

13. The reference electrode of claim 1, wherein the polymer matrix is modified with a redox-active substance.

14. The reference electrode of claim 1, further comprising a housing having an opening that is sealed off by the salt bridge, wherein at least a section of the electrical conductor is disposed within the housing, and wherein an electrolyte contacting the salt bridge is contained in the housing, wherein the section of the electrical conductor disposed inside the housing contacts the electrolyte.

15. The reference electrode of claim 1, wherein the electrical conductor comprises an electron conductor, which includes carbon fibres.

16. An electrochemical sensor comprising:
    a reference electrode including an electrical conductor, a salt bridge provided for contact with a measuring fluid, and a medium electrically conductively connecting the electrical conductor and the salt bridge to each other, wherein the medium and the electrical conductor are completely isolated with respect to the measuring fluid, wherein the salt bridge comprises a polymer matrix and a conducting salt, wherein the conducting salt is formed from a cation and an anion, and wherein the cation and/or anion are at least partially kept from leaching in the polymer matrix, and wherein the cation and/or the anion of the conducting salt are covalently bonded to the polymer matrix;
    at least one additional electrode; and
    a measurement circuit electrically conductively connected to the reference electrode and the additional electrode, and which is configured to generate electrical measuring signals representing a concentration or activity of an analyte in the measuring fluid.

17. A method for producing a reference electrode, the reference electrode including an electrical conductor, a salt bridge provided for contact with a measuring fluid, and a medium electrically conductively connecting the electrical conductor and the salt bridge to each other, wherein the medium and the electrical conductor are completely isolated with respect to the measuring fluid, wherein the salt bridge comprises a polymer matrix and a conducting salt, wherein the conducting salt is formed from a cation and an anion, and wherein the cation and/or anion are at least partially kept from leaching in the polymer matrix, the method including steps of:
    applying a solution of a polymerizable monomer or oligomer, a vulcanizable prepolymer or a vulcanizable polymer preparation or of a polymer as well as a cation and an anion of a conducting salt to an electrically conductive carrier; and
    drying the solution and/or polymerizing the monomers or oligomers and/or crosslinking or vulcanizing the prepolymer and/or the polymer preparation to form a layer comprising a polymer matrix in which the cation and/or the anion covalently bonded to the polymer matrix.

18. The method of claim 17, wherein the electrically conductive carrier on which the layer is formed comprises an electrical conductor or an electrical conductor having an electrically conductive coating.

19. A method for conditioning or regenerating a reference electrode, the reference electrode including an electrical conductor, a salt bridge provided for contact with a measuring fluid, and a medium electrically conductively connecting the electrical conductor and the salt bridge to each other, wherein the medium and the electrical conductor are completely isolated with respect to the measuring fluid, wherein the salt bridge comprises a polymer matrix and a conducting salt, wherein the conducting salt is formed from a cation and an anion, and wherein the cation and/or anion are at least partially kept from leaching in the polymer matrix, wherein the medium electrically conductively connecting the electrical conductor and the salt bridge to each other is configured as an intermediate layer in electrically conductive contact with the conductor and the salt bridge, the method including steps of:
    immersing at least a region of the reference electrode comprising the salt bridge and a counter electrode arranged on a side of the salt bridge facing away from the electrical conductor in an electrically conductive fluid;
    applying a voltage across the salt bridge between the electrical conductor and the counter electrode, in such a way that the intermediate layer and/or a redox-active substance with which the intermediate layer or polymer matrix of the salt bridge is optionally modified is either oxidized or reduced, as desired.

20. A reference electrode comprising:
    an electrical conductor;
    a salt bridge provided for contact with a measuring fluid; and
    a medium electrically conductively connecting the electrical conductor and the salt bridge to each other, wherein the medium and the electrical conductor are completely isolated with respect to the measuring fluid;
    wherein the salt bridge comprises a polymer matrix and a conducting salt;
    wherein the conducting salt is formed from a cation and an anion;
    wherein the cation and/or anion are at least partially kept from leaching in the polymer matrix;
    and wherein the electrical conductor comprises carbon fibres.

* * * * *